Aug. 30, 1927.

W. MÖBUS 1,640,513

CUTTING AND WORK TREATING MACHINE

Filed Feb. 14, 1925     3 Sheets-Sheet 1

INVENTOR

Wilhelm Möbus

Aug. 30, 1927.
W. MÖBUS
1,640,513
CUTTING AND WORK TREATING MACHINE
Filed Feb. 14, 1925     3 Sheets-Sheet 2
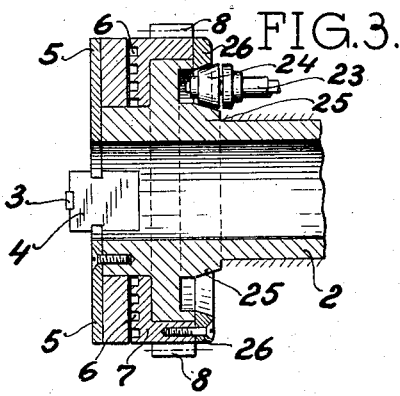
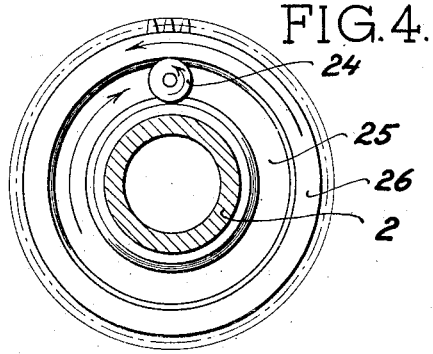
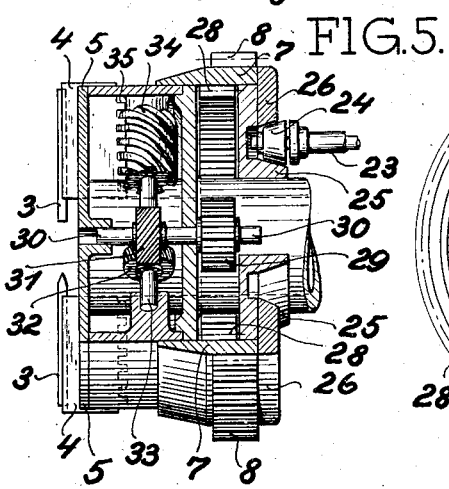
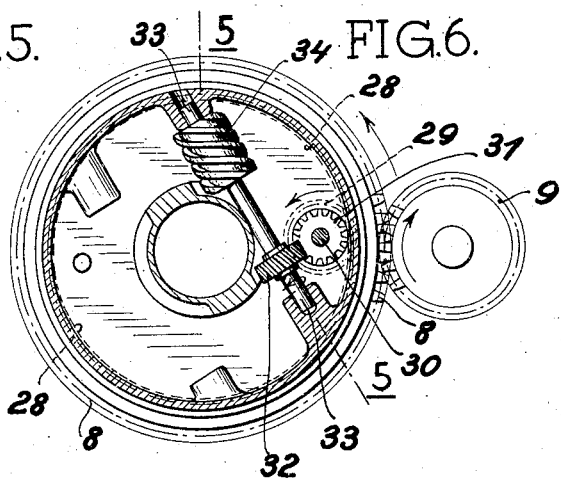
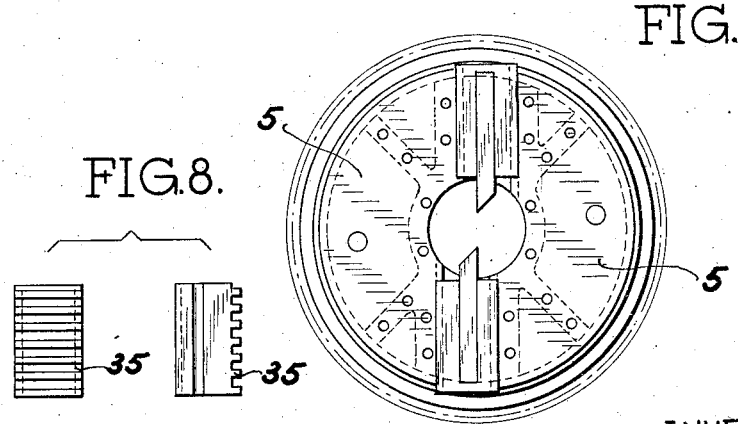
INVENTOR
Wilhelm Möbus Aug. 30, 1927. 1,640,513
W. MÖBUS
CUTTING AND WORK TREATING MACHINE
Filed Feb. 14, 1925  3 Sheets-Sheet 3

INVENTOR
Wilhelm Möbus

Patented Aug. 30, 1927.

1,640,513

UNITED STATES PATENT OFFICE.

WILHELM MÖBUS, OF DUSSELDORF, GERMANY.

CUTTING AND WORK-TREATING MACHINE.

Application filed February 14, 1925, Serial No. 9,239, and in Germany February 15, 1924.

This invention has reference to cutting, indexing and marking machines which are particularly adaptable for the cutting, treating and machining of shafts and the like, and it is one of the important features of this invention that after the cutting or other treatment the tools or means employed for this purpose are caused to be withdrawn at an increased speed and by positive means, so that a higher efficiency and greater economy is produced than it is possible to obtain with the machines of the kind referred to in accordance with the previous art. In the machine according to this invention the driving means for the tools is thrown out of operation after the cutting or equivalent operation has been effected, while at the same time means for effecting the withdrawal of the tools are operated in such a manner, as to be actuated by the continued rotation of the cutting head, by which means the tools are immediately and positively compelled to assume a rapid receding movement, thereby reducing to a minimum the time required for the return of the tools to their initial position. The feeding and withdrawing means employed in accordance with this invention may be of different construction; they may among other possibilities, comprise, for example, a rotatable plane threaded disc with the threads or cam grooves of which the tool holders may be directly in engagement; of the other possible means, mention may be made of a combination of the centrally operating cutting tools or the like with separately driven shafts arranged at an acute angle to said tools and provided with driving worm gears for the tools or the like, the arrangement being such that the tool holders are directly or indirectly projected or retracted by the rotating shafts and in accordance with direction of rotation of the same. In any case all the driving members of the machine are mounted within the closed cutting head, so as to exclude the possibility of clogging with dirt, and the thereby resulting interruptions or interference with the operation of the machine and of the plant.

Figure 1:
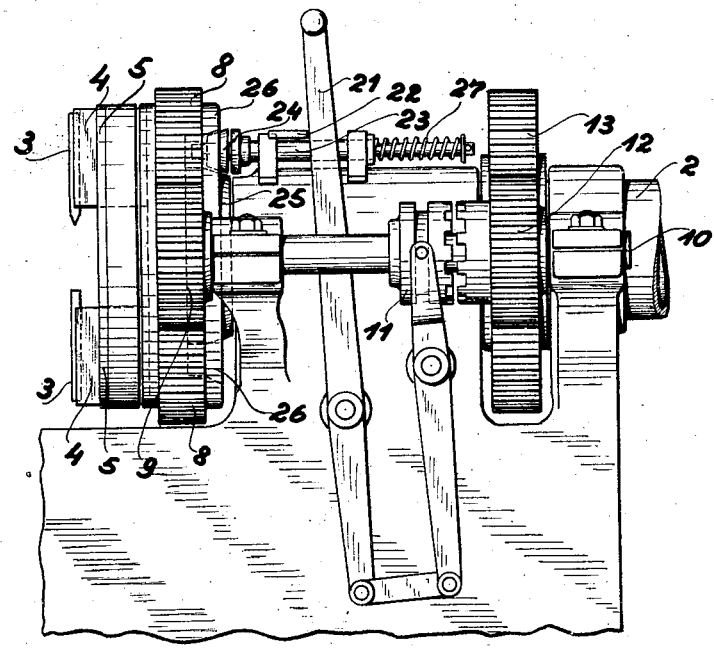
Figure 2:
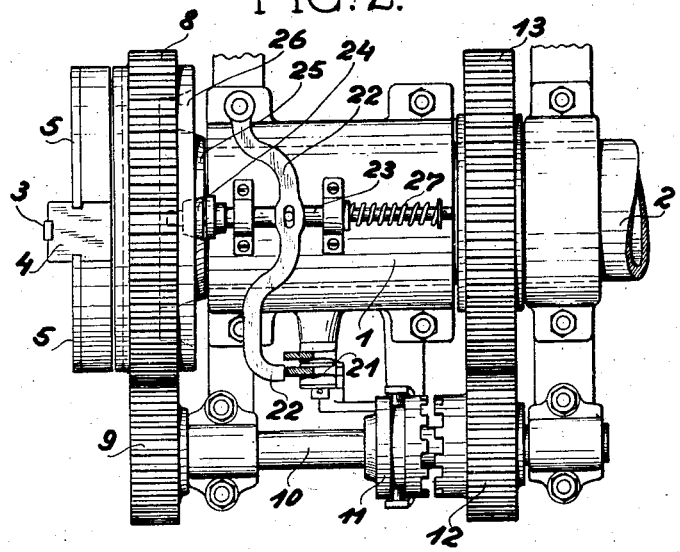
Figure 9:
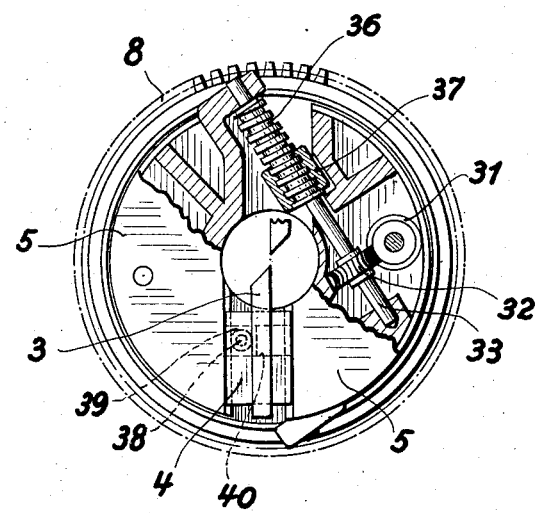
Figure 10:
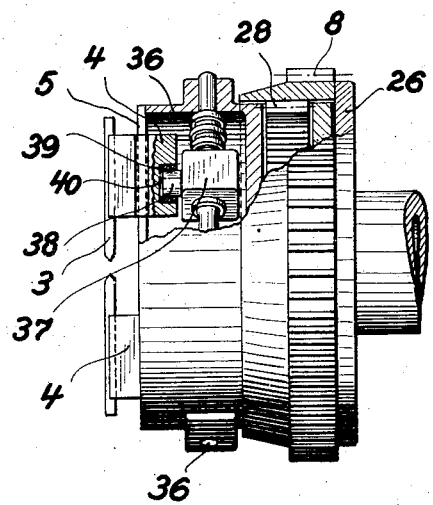

On the accompanying drawings I have shown by way of example several embodiments of the principles of this invention, Figure 1 showing the machine in side elevation; Figure 3 is a sectional view of the left hand portion of the machine at right angles to Figure 1. Figure 2 is a sectional plan view of the machine shown in Figure 1. Figure 4 is a rear view with parts in section. Figures 5 to 8 represent a modified form of construction; in Figure 5 in axial longitudinal section; in Figure 6 in rear elevation; in Figure 7 in front elevation. Figure 8 is a detail to be referred to. Another modification is shown in Figures 9 and 10 in longitudinal section and in rear elevation respectively.

As appears from the construction shown as an exemplification in Figures 1 to 4, the operation of the cutting head is effected by the hollow shaft 2 mounted in the frame 1. The cutting tools 3 are mounted in tool holders 4 adapted to be slidingly guided in a plate 5 connected to the shaft 2. The tool holders 4 are threaded for engagement with the plane threads 6 of the annulus or ring 7 rotatably mounted on the shaft 2 and provided with the outer threads 8 adapted for engagement with the gear wheel 9 on the shaft 10. Another wheel 12 on the same shaft 10 which may be coupled and uncoupled by the clutch 11 meshes with a wheel 13 which is keyed to the shaft 2. The train of actuating gearing and the fastening means for the piece of work have not been shown on the drawing, as being immaterial for the understanding of the invention. The clutch 11 may be operated by a system of levers 21. In the frame 1 a lever 22 is mounted one end of which is disposed within the path of movement of the lever 21. The lever 22 acts upon an unround or cross-sectionally cam-shaped bar 23 under the influence of a strong spring 27 and provided at its free end with a conical roller 24. This roller 24 in its inoperative position is mounted with play in an annular groove which is formed by a conically bevelled annular surface 25 of an annular disc 26 connected to the ring 7.

The operation of the machine is effected substantially as follows:—

After the piece of work to be operated upon has been mounted in position and the actuating train of gearing has been started, the clutch 11 is thrown into engagement with the result that by means of the wheels 9 and 8 the speed of the ring 7 is increased, in view of the fact that the rate of transmission between the wheels 12, 13 is greater than the transmission between the wheels 9 and 8. In consequence of this differential driving means the cutting tools 3 are correspondingly centrally fed forward. After the cutting off of the piece of work the coupling clutch 11 is disengaged, so as to throw the driving gear 9, 8 out of operation. Upon moving the lever 21 further to the left it becomes engaged with the lever 22 causing the frictional roller 24 to be moved in the axial direction in the annular groove formed by the parts 26 and 25. By this means the direction of rotation of the annular disc 26 and accordingly of the ring 7 is immediately reversed, so that a rapid positive retraction of the tool is effected without reducing the operating speed of the shaft 2. By the movement of the lever 21 towards the right this retraction is interrupted at once, inasmuch as the strong spring 27 withdraws the frictional roller 24 immediately from contact with the corresponding frictional surfaces.

In Figures 5 to 8 another form of exemplification of the invention is shown which is merely distinguished from the one above described by a different kind of operating means for the tools. In this form of construction the ring 7 is provided, besides with the peripheral gear 8, with an internal gear 28 adapted for engagement with the pinions 29. From the shafts 30 of the pinions 29 the driving movement by means of worm wheels or the like 31, 32 is transmitted to the shafts 33 which are mounted in the cutting head in an inclined position with relation to the centrally directed operating tools. Upon the shafts 33 the worms 34 are mounted and adapted for enagement with the rack teeth 35 of the tool holders 4. The pitch of the worms 34 and the angle of inclination of the shaft 33 are so adjusted with relation to each other that the portions of the worm in engagement with the gear or rack teeth 35 of the tool holders 4 are parallelly directed with relation to such teeth 35, as will appear from Figure 8. The action of the moving parts is the same as with reference to the exemplification first described. The accelerated driving movement of the wheel 8 the speed of which is increased with regard to the rotating speed of the cutting head, is transmitted to the tool holders 4 by means of the gearing 28 and the pinion and driving means 29 to 35, so as to cause the cutting tools 3 to be centrally moved towards the inside. After the uncoupling of the driving means and after the throwing into operation of the frictional roller 24 the reversal of movement of the parts of gearing 28, 7, 26 to 34 is effected so as to reduce the rapid and positively effected retraction of the tools.

Another form of exemplification of the invention is shown in Figures 9 and 10 of the drawing. In this modification the worms 36 do not directly engage with a gearing or rack teeth of the tool holders 4, but by the rotation of the worms 36, shown in these figures the unrotatable nuts 37 in engagement therewith are axially displaced. Said nuts 37 are provided with studs 38 in engagement with slides 39 disposed in tarnsverse grooves 40 of the tool holders 4. By the rotation of the worm 36 the nuts 37 are therefore moved in the outer or inner direction, and in this movement by means of the slides 39 carry the tool holders with the tools along with them. Inasmuch as in this modification the shafts 33 are likewise disposed at an inclination with regard to the tools, the sides 39 will be reciprocated in the grooves 40 in the upward and downward movement, without thereby interfering with the unobjectionable operation of the driving and operating gears. In view of the fact that in the exemplifications according to Figures 5 to 10 the tools are disposed within the sliding faces of the tool carriages and in consequence of the inclined position of the driving shafts 33 relatively to the feeding movement of the carriage all causes of any possible idle movement upon the adjustment and change of movement of the parts are avoided and eliminated.

The invention is not limited to the modes of exemplifications hereinbefore shown and described, but it is susceptible of other modifications and changes in accordance with varying conditions of application, and without thereby deviating from the scope and spirit of the invention, as expressed by the claims, hereunto appended.

I claim:—

1. In a cutting tool, the combination with a cutting head and tools radially operated thereby, of gearing for advancing the tools, coupling means in operative connection with the said gearing, and adapted to cause the engagement and disengagement thereof with the tools, and means for withdrawing the tools connected to the cutting head, and adapted for operation by said coupling means.

2. The combination with a constantly rotating tool carrying head, and tools radially reciprocated thereby, of gearing for advancing the tools, means to cause the withdrawal of the tools, operable by the cutting head, and a coupling clutch intermediate the cutting head and the gearing and the cutting head and the withdrawing means and operative for selectively throwing the same into and out of action.

3. The combination with a constantly rotating tool carrying head, and reciprocatingly operated tools connected thereto, of speed increasing means engageable with said tools, frictionally and spring actingly operated tool-withdrawing means operatively connected to the cutting head, and coupling means intermediate the head and the speed increasing means and intermediate the cutting head and the withdrawing means, and guiding means for the tools.

4. The combination with a constantly rotating tool head and reciprocatingly operated tools connected thereto, of a rotatable disc in operative engagement with the tools, spring actuated frictional means adapted for the return of movement of said disc, speed increasing means for said disc, coupling means connected to the head and engageable with the speed increasing means and the frictional means, and adapted to cause the increase of speed of the tools in the feeding movement and the sudden withdrawal of the tools according to the adjustment of said coupling means.

5. The combination with a constantly rotating tool carrying head and reciprocating tools operated thereby, of gear elements axially inclined with relation to the direction of movement of the tools and operatively connected thereto, a rotatable element for driving said gear elements, motion reversing means for said rotary element and coupling means for engagement with the rotary element and the reversing means to cause an increased feeding movement of the tools and a rapid retraction thereof.

6. The combination with a constantly rotating tool carrying head and radially operated tools connected thereto, of tool holders for said tools, worm wheels axially inclined with relation to the direction of movement of the tools, and operatively connected with the tool holders, speed increasing means for the tool-holders and tools, and motion reversing means engageable with the tool holders and tools, and coupling means operatively engageable with the head and engageable and disengageable with the speed increasing and motion reversing means.

7. The combination with a constantly rotating tool carrying head and tools radially reciprocated thereby, of guiding means for said tools, speed increasing means engageable with the guiding means and the tools, and motion reversing means engageable with the guiding means and the tools, driving means, coupling means engageable therewith, and means for operatively connecting the coupling means with the speed increasing or with the motion reversing means.

8. The combination with a constantly rotating tool carrying head and tools radially reciprocated thereby, of guiding means for said tools, speed increasing means operatively engageable with the guiding means and the tools, frictionally and spring actuatingly operated motion reversing means engageable with the guiding means, driving means, coupling means, operatively connected to the driving means, and means to engage the coupling means with the speed increasing means or with the frictional motion reversing means.

9. The combination with a constantly rotating tool carrying head and tools, radially reciprocated thereby, of a driving shaft for the tools, a speed increasing annular gear mounted for independent rotation on said shaft, and engageable with the tools, annular guiding means comprising complemental portions of the shaft and the annular gear, a friction roller, spring-actingly engageable with said guiding means, driving means, coupling means operatively connected thereto, and operating means for the coupling means, adapted to cause the engagement of the coupling means with the speed increasing means and the friction roller, thereby causing the undiminished driving speed of the roller to be transmitted to the annular gear by means of the frictional roller causing a reversal of the direction of movement which is immediately interrupted by the manipulation of the coupling-operating means.

10. The combination with a constantly rotating tool carrying head, and tools carried thereby and radially adjustable for engagement with and disengagement from the work, of a rotary tool adjusting element on the head movable in opposite directions for advancing and retracting the tools, a set of gearing for rotating the tool adjusting element in one direction, a set of gearing for rotating the tool adjusting element in the opposite direction, and controlling means shiftable to different positions for throwing said gearings into and out of action.

11. The combination with a constantly rotating tool carrying head, tools carried thereby, and means including a rotary member on the head movable in opposite directions for radially advancing and retracting the tools, toothed gearing for driving said element in one direction, friction gearing for driving said element in the opposite direction, and controlling means adjustable in different directions for throwing said toothed gearing and friction gearing into and out of action.

12. The combination with a constantly rotating tool carrying head, tools carried thereby, a shaft extending across the head at an angle to the axis thereof, gearing between said shaft and the tools, a rotary member on the head movable in opposite directions to actuate the shaft and gearing for radially advancing and retracting the tools, sets of gearing operated from the same source of power as the head for shifting said element in opposite directions, and controlling means movable in opposite directions for throwing said gearings into and out of action.

WILHELM MÖBUS.